US011470834B2

(12) United States Patent
Price et al.

(10) Patent No.: US 11,470,834 B2
(45) Date of Patent: Oct. 18, 2022

(54) BOOM MOUNTED SPRAY NOZZLE ASSEMBLY WITH MULTI CHECK VALVE COMPACT DESIGN

(71) Applicant: Spraying Systems Co., Wheaton, IL (US)

(72) Inventors: Trevor Price, Crystal Lake, IL (US); T J Winter, Vernon Hills, IL (US); Marc Arenson, Bartlett, IL (US); Rich Gould, Glen Ellyn, IL (US)

(73) Assignee: Spraying Systems Co., Wheaton, IL (US)

( * ) Notice: Subject to any disclaimer, the term of this patent is extended or adjusted under 35 U.S.C. 154(b) by 179 days.

(21) Appl. No.: 16/669,179

(22) Filed: Oct. 30, 2019

(65) Prior Publication Data

US 2020/0128810 A1    Apr. 30, 2020

Related U.S. Application Data

(60) Provisional application No. 62/753,768, filed on Oct. 31, 2018.

(51) Int. Cl.
*A01M 7/00* (2006.01)
*B05B 13/02* (2006.01)

(52) U.S. Cl.
CPC .......... *A01M 7/0089* (2013.01); *A01M 7/006* (2013.01); *A01M 7/0071* (2013.01); *B05B 13/0278* (2013.01)

(58) Field of Classification Search
CPC .. A01M 7/0089; A01M 7/006; A01M 7/0071; B05B 13/0278
See application file for complete search history.

(56) References Cited

U.S. PATENT DOCUMENTS

2006/0265106 A1    11/2006  Giles et al.
2015/0367358 A1*   12/2015  Funseth ................ B05B 1/1645
                                                   239/159

FOREIGN PATENT DOCUMENTS

EP           2957346 A1    12/2015
EP           3035007 A1     6/2016
WO    WO 2008/039540 A2     4/2008

OTHER PUBLICATIONS

European Patent Office, International Search Report and Written Opinion in corresponding International Patent Application No. PCT/US2019/059023 dated Feb. 6, 2020 (14 pages).

* cited by examiner

*Primary Examiner* — Steven M Cernoch
(74) *Attorney, Agent, or Firm* — Leydig, Voit & Mayer Ltd.

(57) ABSTRACT

A liquid spraying system having an elongated liquid supply boom and a plurality of spray nozzle assemblies. The spray nozzle assemblies have a compact design with a nozzle body having a liquid inlet and a first spray nozzle carrying liquid outlet section on opposite upper and lower sides, second and third spray nozzle carrying liquid outlet sections disposed in transverse relation to the supply boom; and first and second check valve supporting sections disposed parallel to the liquid supply boom. A first of check valves is operable for controlling liquid flow from the supply boom to one or both of the second and third spray nozzles, and a second check valve is operable for controlling liquid flow from said liquid inlet to said first spray nozzle. The illustrated check valves are operable in response to the pressure of the supply liquid.

11 Claims, 6 Drawing Sheets

BOOM MOUNTED SPRAY NOZZLE ASSEMBLY WITH MULTI CHECK VALVE COMPACT DESIGN

CROSS-REFERENCE TO RELATED APPLICATION

This patent application claims the benefit of U.S. Patent Application No. 62/753,768 filed Oct. 31, 2018, which is incorporated by reference.

FIELD OF THE INVENTION

The present invention relates generally to liquid spray booms such as those pulled in the field behind a tractor of the like for agricultural spraying, and more particularly, to an improved spray nozzle assembly for use on such booms.

BACKGROUND OF THE INVENTION

Agricultural spray booms typically carry a large number of laterally spaced spray nozzle assemblies along the length of the boom. Each spray nozzle assembly commonly comprises a plurality of spray nozzles including one or more turret mounted spray nozzles which include a rotatable turret carrying a multiplicity of different spray tips for selected indexing to an operative position. Such spray nozzle assemblies further commonly include one or more check valves for instantaneously interrupting the discharge of liquid from the spray nozzles upon shut off of the liquid supply for preventing waste and over application of the liquid chemical, which further adds to the bulk and size of each assembly Such liquid spray booms can be relatively long in length, such as 80 feet or more, to maximize spraying during each path of travel. To facilitate transport and storage of the spray boom when not in use, the spray booms have pivot joints that enable opposite sides or segments of the boom to be folded into side by side relation to each other. Due to the bulk and size of the spray nozzle assemblies and their protuberance forwardly and rearly from the boom, upon positioning of the spray boom sections into overlying side by side relation, the spray nozzle assemblies can come into engaging and damaging contact with each other, necessitating repair or replacement and downtime of the sprayer.

OBJECTS AND SUMMARY OF THE INVENTION

It is an object of the present invention to provide a liquid spray boom having a multiplicity of spray nozzle assemblies along the length thereof designed for more reliably permitting folding or pivoting of sections of the boom into a side by side relation without interfering, contacting engagement of the spray nozzle assemblies.

Another object is to provide a spray nozzle assembly for use on liquid spray booms that has a more compact design for preventing interfering contact between spray nozzles upon pivotable side by side positions of sections of the boom.

A further object is to provide a spray nozzle assembly as characterized above that has a multi check valve compact design for interrupting the terminal flow of liquid to a multiplicity of nozzles without undesirable protuberance from the assembly.

Another object is to provide a spray nozzle assembly of the foregoing type that is relatively simple in construction and which lends itself to economical manufacture.

Other objects and advantages of the invention will become apparent upon reading the following detailed description and upon reference to the drawings.

Figure 1:
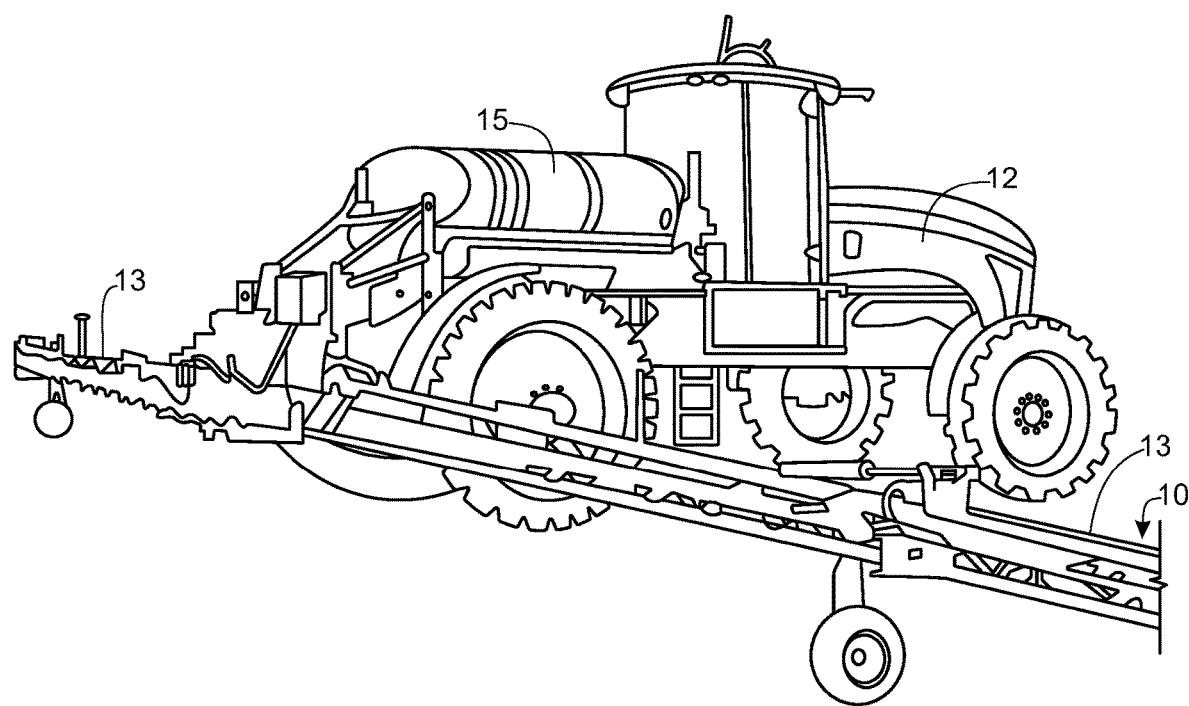
FIG. 1 is a perspective of an illustrated spray boom in accordance with the invention being pulled by a motorized tractor.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative spray boom 10 (FIG. 1) having a plurality of liquid spray nozzle assemblies 11 (FIGS. 2-5) for spraying chemicals or other liquids onto a field along strips corresponding to the width of the spray boom 10 as it is being pulled by a tractor 12 or the like. The spray boom 10 in this case includes laterally extending support members 13 which supports a liquid supply conduit 14 (FIGS. 2-5) along the length thereof, which may be coupled to a liquid supply tank 15 carried by the tractor 12. As is known in the art, the spray boom 10 support members 12 may comprise a plurality of elongated segments or sections that are coupled together to permit pivoting of the spray boom sections into adjacent side by side relation for transport or storage.

The spray nozzle assemblies 11 in this instance each are supported in depending fashion from the liquid supply conduit 14. To this end, illustrated liquid spray nozzle assemblies 11 each include a nozzle support body 16 which comprises a mounting and liquid inlet section 18 on an upper side thereof, a bottom liquid outlet section 19 on underside thereof that carries a spray nozzle 20, and front and back liquid outlet sections 21, 22 respectively (FIG. 4) on appropriate lateral sides of the nozzle body 16 transverse to the liquid supply boom 14 each designed for supporting a turret spray nozzle 24, one of which is shown on the front liquid outlet section 21 (FIG. 1). In the illustrated embodiment, as viewed in FIGS. 3 and 4, the back liquid outlet section 22 is laterally offset slightly (to the left as viewed in FIG. 2) from the front liquid outlet section 21. It will be understood that the terms "upper", "bottom", "front", and "back" as used herein are not limited to their literal meaning, but are intended as relative terms in relation to the spray nozzle assembly 11 illustrated in the drawings. In other words, the spray nozzle assemblies may be coupled to the liquid supply conduit 14 with different orientations in which the liquid inlet and outlet sections of the support body 16 are not located on the "upper" and "lower" sides of the support body as illustrated.

Figure 2:
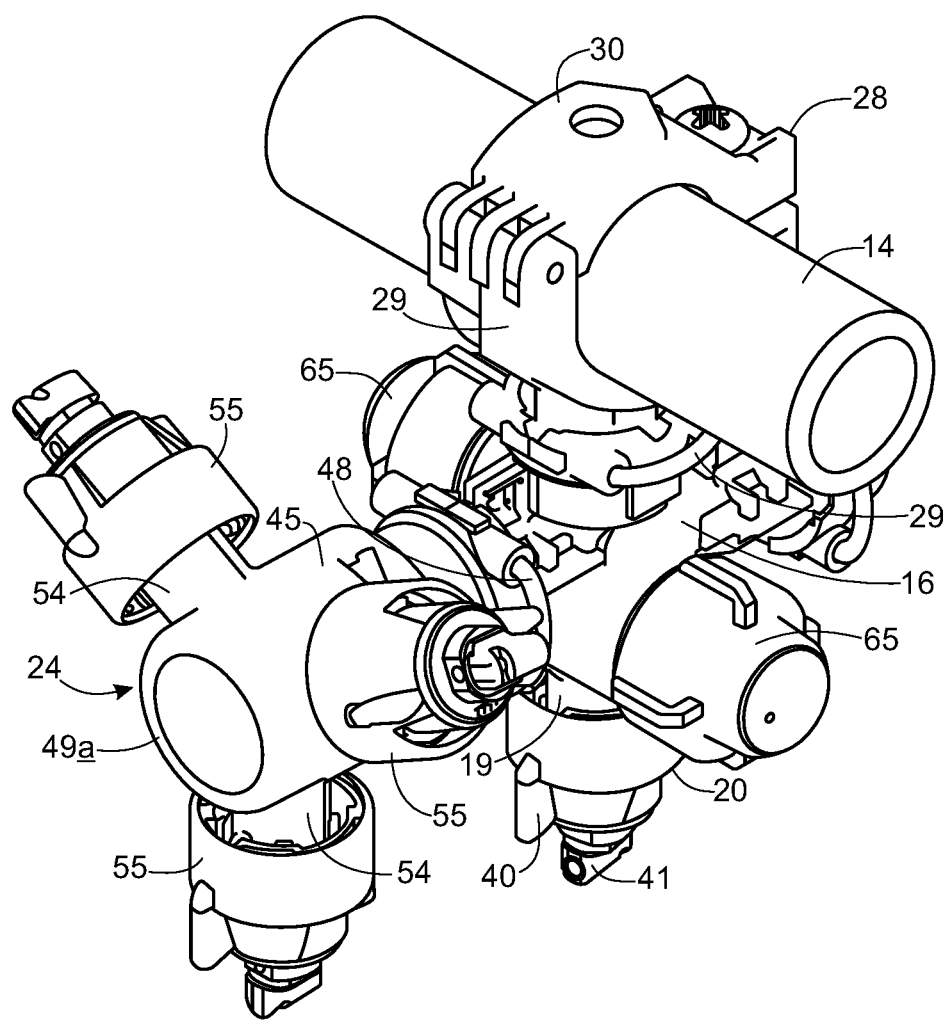
FIG. 2 is an enlarged perspective of one of the spray nozzle assemblies supported by a liquid supply conduit carried by the illustrated spray boom.
Figure 3:
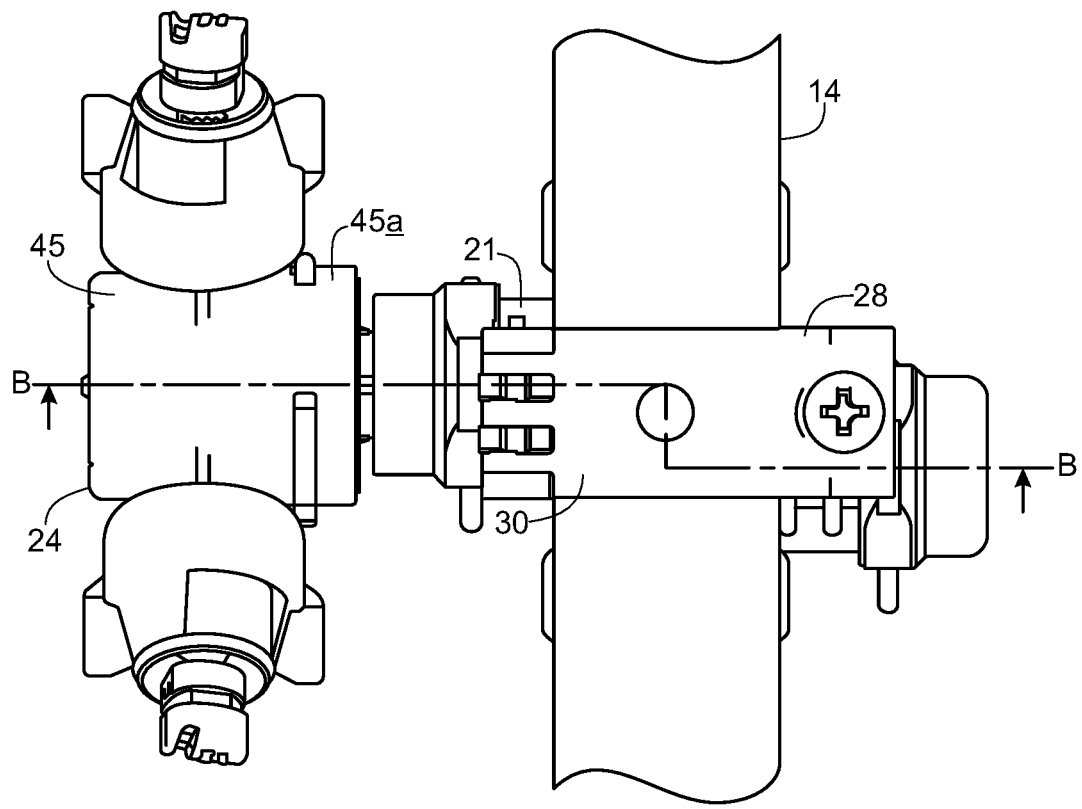
FIG. 3 is a top plan view of the spray nozzle assembly shown in FIG. 2.
Figure 4:
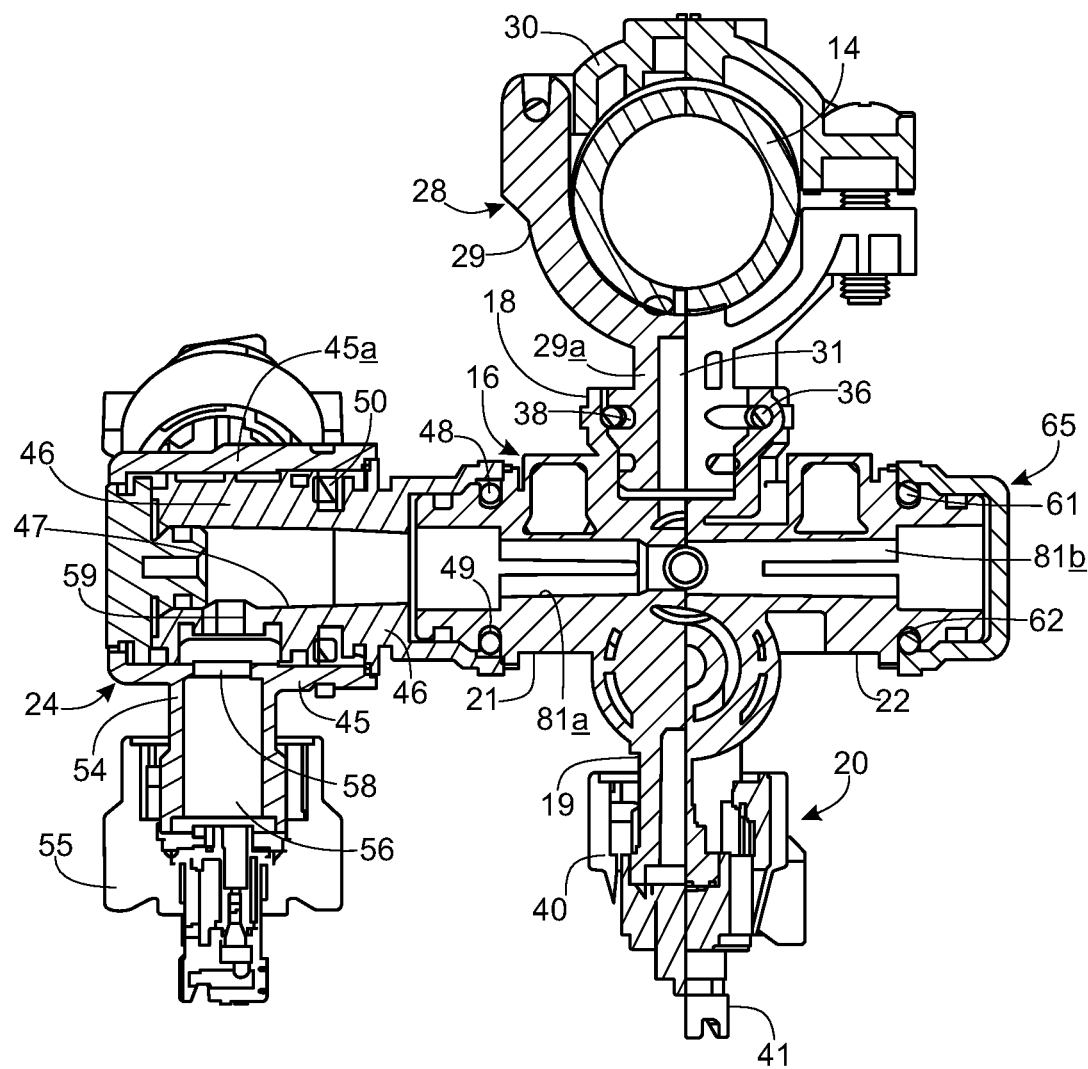
FIG. 4 is a vertical section of the illustrated spray nozzle assembly taken in the plane of line 4-4 in FIG. 3.
Figure 5:
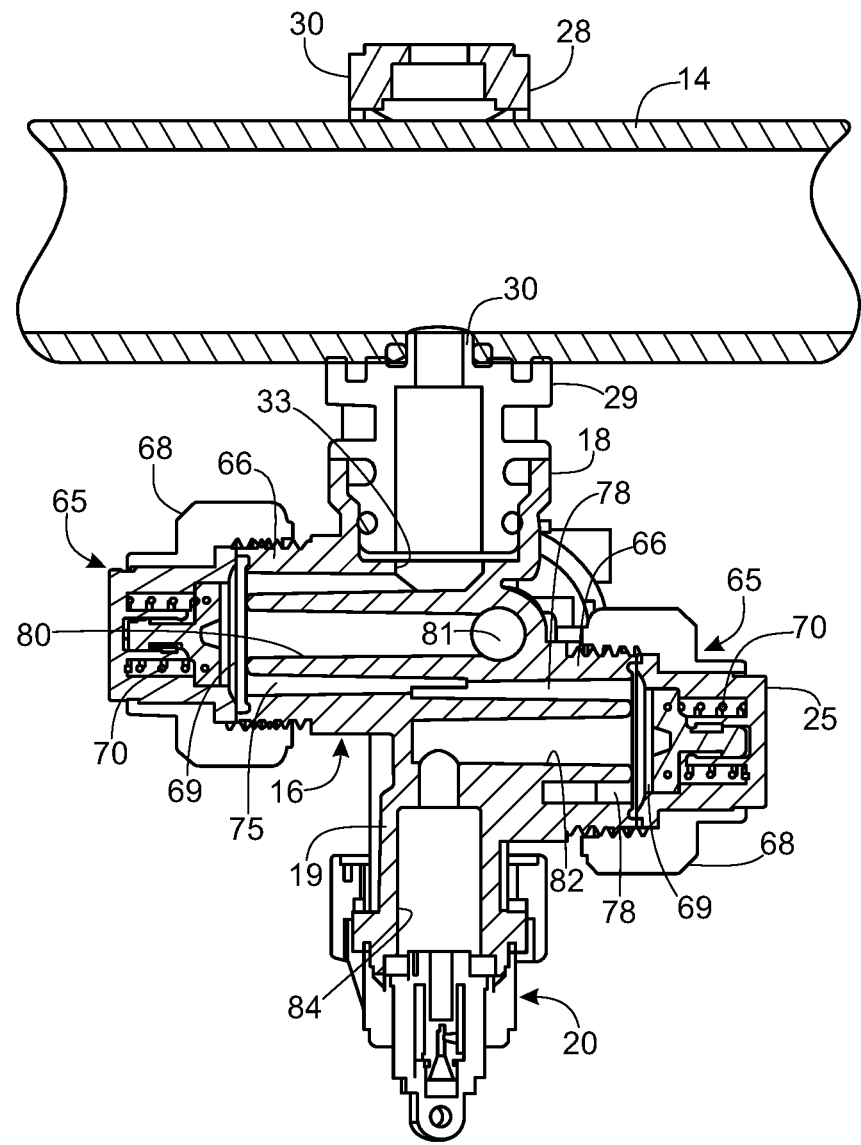
FIG. 5 is a vertical section of the illustrated spray nozzle assembly taken in a plane through the center of the liquid supply conduit of the spray boom.

For securing the spray nozzle assembly 11 to the liquid supply conduit 14, a clamping device 28 is provided that includes a cradle-shaped mounting flange 29 positioned adjacent an underside of the liquid supply conduit 14 and a clamping element 30 pivotably connected to one end of the mounting flange 29 and positionable over the liquid supply conduit 14 for securement to an opposite end of the mounting flange 29. The mounting flange 29 has a nipple 30 (FIG. 5) which extends upwardly into the liquid supply conduit 14 through which a pressurized liquid from the conduit 14 enters for direction through a liquid passage 31 in a depending hub portion 29a of the mounting flange 29. The liquid inlet section 18 of the nozzle support body 16 in this case is in the form of an upwardly opening receptacle 35 for receiving the mounting flange hub 29a and is removably secured to the hub 29a by a quick disconnect coupling comprising a U-shaped pin 36 having opposite legs that extend through passages in the receptacle 35 and opposite sides of an outer annular retention groove 38 of the hub 29a (FIGS. 2 and 4). The liquid inlet section 18 has a liquid inlet passage 33 communicating with the hub portion passage 31.

The illustrated spray nozzle 20 on the bottom liquid outlet section 19 is of a conventional quick disconnect type, such as shown in U.S. Pat. No. 6,749,134 assigned to the same assignee as the present application, the disclosure of which is incorporated herein by reference. It should be understood that other types of spray nozzles could be used. The spray nozzle 20 in this case comprises a cap 40 which carries or is formed with a spray tip 41 and is operable for quick disconnect coupling onto camming and locking lugs 42 (FIG. 6) of the liquid outlet section 19.

The turret spray nozzle 24 in this case comprises a turret 45 having a cylindrical hub 45a mounted on a turret mounting stem 46 (FIG. 4) removably fixed to the front liquid outlet section 21 by a quick disconnect coupling comprising U-shaped retainer pin 48 with opposite legs engaging opposite sides of an annular retention groove 49 in the mounting stem 46. The turret hub 45a in turn is rotatably supported on the mounting stem 46 while being axially retained by a U-shaped clip 50 having legs positionable through passages in the hub 45a and opposite sides of an annular retention groove 51 in the mounting stem 46. The mounting stem 46 has a central liquid passageway 47 communicating with a liquid outlet of the liquid outlet section 21 upon which it is mounted, as will become apparent, and a radial liquid outlet port 59 communicating with the central liquid passage 47 at a location intermediate ends of the stem 46.

The turret 45, as is known in the art, has a plurality of circumferentially spaced nozzle mounting stems 54 extending radially outward of the hub 45a. Each nozzle mounting stem 54 in this case has diametrically opposed radial camming and locking lugs for receiving a quick disconnect spray nozzle 55 similar to the nozzle 22. Each nozzle mounting stem 54 has a central liquid flow passage 56 (FIG. 4) communicating between the spray nozzle 55 and the respective inlet passage 58 in the hub 45a which in turn can be selectively brought into aligned relation with the radial liquid outlet passage 59 in the turret mounting stem 46 by rotational indexing of the hub 45a to an operative position for a selected spray tip 55.

It will be understood that a similar turret spray nozzle 24 may be mounted on the back liquid outlet section 22 in addition to, or in the alternative of, the turret spray nozzle 24 mounted on the front liquid outlet section 21. When the forward or back liquid outlet section 21 or 22 does not support a turret spray nozzle 24, an end cap 60 may be mounted on the outlet section 21 or 22 for closing off the end of the outlet passage thereof. The retention cap 60 in this case is again has a quick disconnect coupling comprising a U-shaped pin 61 with legs similarly positioned through apertures in the end cap and opposite sides of an annular retention groove 62 on the outlet passage section.

In accordance with an important aspect of this embodiment, the spray nozzle assembly 11 has a pair of check valves 65 for respectively interrupting the liquid flow to (1) the spray nozzle 20 on the bottom liquid outlet section 19 and (2) turret spray nozzles 24 on the front and/or rear liquid outlet sections 21, 22 without increasing the footprint that the spray nozzle assembly 11 protrudes forwardly or rearwardly of the liquid spray boom. To this end, the nozzle support body 16 has check valve support sections 66 on opposite lateral sides transverse to said liquid outlet sections 21, 22 as viewed in FIG. 5, each for receiving and supporting a respective check valve 65. The illustrated check valves 65 in this case each are spring actuated, comprising a check valve cap assembly 68 threaded onto the respective check valve support section 66, a diaphragm positionable adjacent an end of the check valve support section 66, and a biasing spring 70 for urging the diaphragm 69 to a closed position.

In carrying out the present embodiment, the nozzle support body 16 has a unique check valve controlled liquid passage system for supplying liquid to (1) the turret spray nozzles 24 supported on one or both the forward and rear liquid outlet sections 21, 22 and (2) to the spray nozzle 20 carried by the bottom liquid outlet section 19. In the illustrated embodiment, as best viewed in FIGS. 5 and 6, the nozzle support body 16 includes a first annular lateral passage 75 communicating transversely from the liquid inlet passage 33 through one of the liquid check valve support sections 66 and a second transverse annular passage 78 communicating with both the liquid inlet passage 33 and the first annular lateral liquid passage 75 through the opposite check valve support section 66. In the illustrated embodiment, as viewed in FIG. 6, the left hand check valve support section 66 is disposed at a higher elevation than the right hand check valve support section 66 such that a lower segment or portion 75a of the first annular passage 75 communicates with an upper section 78a of the second annular passage 75.

Figure 6:
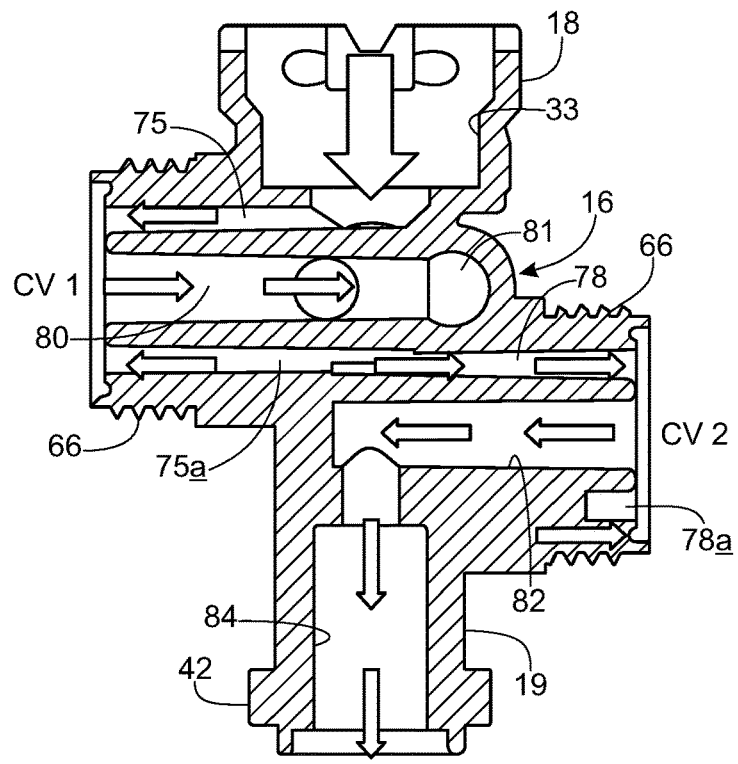
FIG. 6 is a vertical section of the nozzle support body of the illustrated spray nozzle assembly showing the liquid flow through the support body when check valves thereof are in open position.
Figure 7:
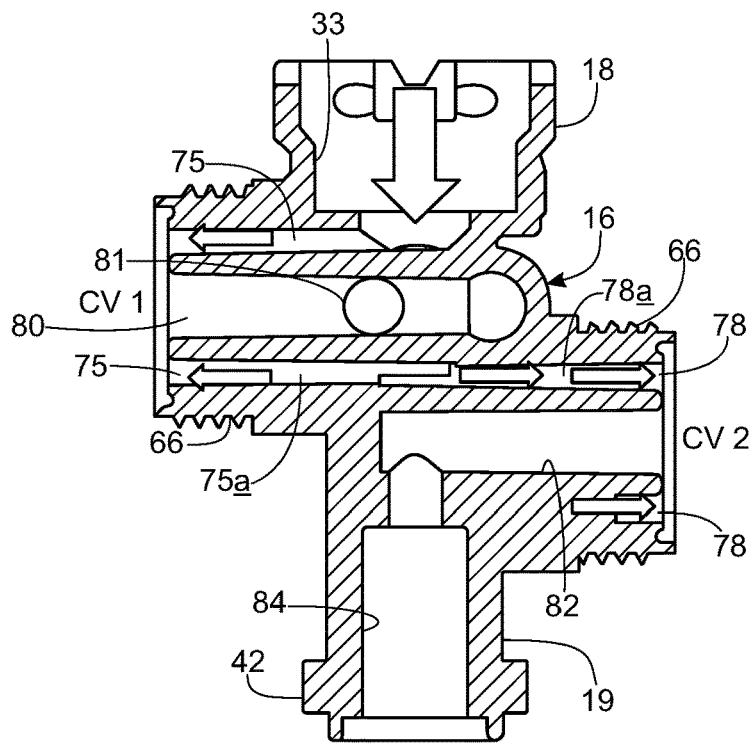
FIG. 7 is a vertical section of the spray nozzle support body, similar to FIG. 6, but showing the liquid flow in the support body when the check valves of the spray nozzle assemblies are in a closed position.

In operation, when the check valves 65 are in an open position as depicted in FIG. 6, such as by virtue of the liquid supply pressure overcoming the biasing force of the springs 70 and opening the check valve diaphragm 69, pressurized liquid travels from the liquid inlet passage 33, the first annular passage section 75 for direction through a central return passage 80 within the first annular passage section 75 to and through a transverse passage 81 in nozzle support body 16 for communication through respective outlet passages 81a, 81b in the second and third liquid outlet sections 21, 22, respectively, for discharge from the turret spray nozzles 24 on either or both of the liquid outlet sections 21, 22. At the same time, liquid travels from the inlet passage 33 through the second annular passage 78 and return through a central check valve return passage 82 within the second annular passage 78 that communicates with a liquid outlet passage 84 of the bottom liquid outlet section 19 and through the spray nozzle 20 supported thereon. When the check valves 65 are moved to a closed position, such as upon the depressurization of the liquid supply, as depicted in FIG. 7, flow from the liquid inlet passage 33 and first annular lateral passage 75 is interrupted, terminating flow through the central return passage 80 and the transverse supply passage 81a to the turret spray nozzles 24, and at the same time, liquid flow supply from the liquid supply passage 33 and the second annular lateral passage 78 is terminated interrupting the flow through the central check valve return passage 82 and liquid outlet passage 84 to the spray nozzle 20.

It will be understood that other forms of check valves can be employed, including electronic or pneumatic controlled check valves. While electronic check valves can be substantially longer in length, it will be appreciated that being supported by the transversely opposed check valve support section 66 in aligned relation to the liquid supply conduit 14, they do not protrude outwardly or increase the transverse footprint of the spray nozzle assembly 11 so as to cause interference with other spray nozzle assemblies 11 upon pivotable movement of the boom sections into a retracted stored or travel position.

Hence, from the foregoing, it can be seen that a liquid spray boom is provided with a multiplicity of spray nozzle assemblies along the length thereof designed for more reliably permitting folding or pivoting of sections of the boom into side by side relation without interfering contacting engagement of the spray nozzle assemblies. The spray nozzle assemblies further have a compact design with a unique check valve liquid control system that enables the usage of a multiplicity of check valves without affecting the transverse footprint of the assemblies.

The invention claimed is:

1. A liquid spraying system comprising;
a liquid supply boom (14);
at least one spray nozzle assembly (11) mounted on said liquid supply boom (14);
said spray nozzle assembly (11) including:
a nozzle body (16);
said nozzle body (16) having a liquid inlet section (18) for receiving liquid to be sprayed and a first liquid outlet section (19) on opposite upper and lower sides thereof; said liquid inlet section (18) having a liquid inlet passage (33) and said first liquid outlet section (19) having a liquid outlet passage (84);
said nozzle body (16) having second and third liquid outlet sections (21, 22)) on opposite lateral sides of said nozzle body (16); said second and third liquid outlet sections (21, 22) each having a respective liquid outlet passage (81a, 81b);
said nozzle body (16) having first and second check valve support sections (66) on opposite lateral sides of said nozzle body (16) transverse to the lateral sides of said second and third liquid outlet sections (18, 19);
a first spray nozzle (20) removably mounted on said first liquid outlet section (19) of said nozzle body (16) with the liquid outlet passage (84) thereof communicating with said first spray nozzle (20);
a second spray nozzle (24) removably mounted on said second liquid outlet section (21) of said nozzle body (46) with a outlet passage (81a) thereof communicating with said second spray nozzle (24);
a first check valve (65) mounted on said first check valve support section (66) of said nozzle body (16);
a second check valve (65) mounted on said second check valve support section (66) of said nozzle body (16);
said nozzle body (16) having a first annular lateral liquid passage (75) and a second annular lateral pas pane (78); said first annular lateral passage (75) communicating between said liquid inlet passage (33) and said first check valve (65) and said second annular lateral liquid passage (78) communicating with said second check valve (65);
said first and second annular lateral passages (75, 78) having parallel longitudinal axes offset from each other with said second lateral passage (78) communicating with said liquid inlet passage (33) and said first annular lateral passage (75),
said first check valve (65) being operable between a closed position for preventing the flow of liquid from said liquid inlet passage (33) through said first annular lateral passage (75) to said second spray nozzle (24) and an open position for permitting the flow of liquid from said nozzle body inlet passage (33) and first annular lateral passage (75) to the outlet passage (81a) of said second liquid outlet section (21) for discharge from said second spray nozzle (24); and
said second check valve (65) being operable between a closed position for preventing the flow of liquid from said liquid inlet passage (33) through said first and second annular lateral passages (75, 78) to the first spray nozzle (20) and an open position for permitting the flow of liquid from said liquid inlet passage (33) and through said first and second annular lateral passages (75, 78) to the outlet passage (84) of said first outlet section for discharge from said first spray nozzle (20).

2. The liquid spraying system of claim 1 in which said first check valve support section (65) has a return liquid passage (80) parallel to first annular lateral passage (75) in fluid communication between said first annular lateral passage (75) and the liquid outlet passage (81a) of said second liquid outlet section (21) for discharging liquid from said second spray nozzle (24) when the first check valve (65) is in an open position.

3. The liquid spraying system of claim 2 in which said second check valve support section (66) has a return passage (82) parallel to said second annular lateral passage (78) in fluid communication between said second annular lateral passage (78) and said liquid outlet passage (84) of said first liquid outlet section (19) for discharging liquid from one of said first spray nozzle (24) when said second cheek valve (65) is in open position.

4. The liquid spraying system of claim 1 in which said first check valve support section (65) has a return liquid passage (80) disposed within and parallel to said annular first annular lateral passage (75) in fluid communication between said first annular lateral passage (75) and the liquid outlet passage (81a) of said second liquid outlet section (21) for discharging liquid from said second spray nozzle (24) when the first check valve (65) is in an open position, and
said second check valve support section (66) has a return passage (82) disposed within parallel to said annular second annular lateral passage (78) in fluid communication between said second annular lateral passage (78) and said liquid outlet passage (84) of said first liquid outlet section (19) for discharging liquid from one of said first spray nozzle (24) when said second check valve (65) is in an open position.

5. The liquid spraying system of claim 1 including a plurality of said spray nozzle assemblies (11) and said plurality of spray nozzle assemblies (11) being mounted in laterally spaced relation along a length of said liquid supply boom (14).

6. The liquid spraying, system of claim 1 in which said nozzle body (16) is supported in depending relation to said elongated liquid supply boom (14) with said second and third liquid outlet sections (21, 22) in transverse relation to said elongated liquid supply boom (14) and said check valve support sections (66) disposed in aligned relation to the elongated liquid supply boom (14).

7. The liquid spraying system of claim 1 in which said second spray nozzle (24) is part of a turret spray nozzle assembly having a plurality of turret nozzles mounted on said second liquid outlet section (21) of said nozzle body (16) for selected rotation for locating one of the plurality of turret nozzles into position for receiving liquid from the liquid outlet passage (81*a*) of the second liquid outlet section (21) when said first check valve being in an open position.

8. The liquid spraying system of claim 7 including a second turret spray nozzle assembly having a plurality of turret nozzles and mounted on said third liquid outlet section (22) for selected rotation for locating one of the plurality of turret nozzles of the second turret spray nozzle assembly into position for receiving liquid form the liquid outlet passage (81*b*) of the third liquid outlet section (22) upon said first check valve (65) being in an open position.

9. The liquid spraying system of claim 1 in which said third liquid outlet section (22) is laterally offset from said first liquid outlet section (21).

10. The liquid spraying system of claim 9 in which one of said check valve support section (66) is disposed at a higher elevation than the other of said check valve section (66).

11. The liquid spraying system of claim 1 in which said check valves (65) are operable to an open position in response to pressurize liquid from said liquid supply boom (14) to said nozzle body inlet passage (33).

\* \* \* \* \*

UNITED STATES PATENT AND TRADEMARK OFFICE
CERTIFICATE OF CORRECTION

| | |
|---|---|
| PATENT NO. | : 11,470,834 B2 |
| APPLICATION NO. | : 16/669179 |
| DATED | : October 18, 2022 |
| INVENTOR(S) | : Trevor Price et al. |

It is certified that error appears in the above-identified patent and that said Letters Patent is hereby corrected as shown below:

In the Claims

In Claim 1, at Column 5, Line 50, "outlet sections (21, 22))" should read --outlet sections (21, 22)--;

In Claim 1, at Column 5, Line 64, "with a outlet passage" should read --with an outlet passage--;

In Claim 1, at Column 6, Line 4, "second annular lateral pas pane" should read --second annular lateral passage--.

In Claim 3, at Column 6, Line 48, "second cheek valve" should read --second check valve--.

Signed and Sealed this
Twelfth Day of November, 2024

Katherine Kelly Vidal
*Director of the United States Patent and Trademark Office*